United States Patent Office 3,576,893
Patented Apr. 27, 1971

3,576,893
PROCESS FOR FORMING CHLOROIODO AND DICHLORO COMPOUNDS
William C. Baird, Jr., Rahway, N.J., assignor to Esso Research and Engineering Company
No Drawing. Filed Apr. 1, 1968, Ser. No. 717,991
Int. Cl. C07c 17/02, 21/04, 25/14
U.S. Cl. 260—651                             23 Claims

ABSTRACT OF THE DISCLOSURE

Chloroiodo and dichloro substituted organic compounds are selectively prepared by reacting an organic compound containing at least one nonaromatic carbon to carbon double bond with cupric chloride and an iodide donor in hydrocarbon media.

BACKGROUND OF THE INVENTION

This invention relates to a novel halogenation process. More particularly, this invention relates to a halogenation process wherein an organic compound containing at least one nonaromatic carbon to carbon double bond is reacted with cupric chloride and an iodide donor in a hydrocarbon medium. In one embodiment, chloroiodo compounds are prepared using cyclic or acyclic, substituted or unsubstituted aliphatic monoolefins, nonconjugated aliphtaic diolefins or an alkene substituted aromatic compound wherein the nonaromatic carbon to carbon double bond is not alpha to the aromatic hydrocarbon radical as the starting material. In another embodiment of this invention, conjugated aliphatic diolefins or alkene substituted aromatic compounds wherein the nonaromatic carbon to carbon double bond is alpha to the aromatic hydrocarbon radical are employed as the unsaturated feeds and saturated and unsaturated dichloro compounds are produced.

DESCRIPTION OF THE PRIOR ART

One of the classical reactions of the carbon to carbon double bond is its combination with molecular chlorine, iodine, or an interhalogen compound, such as iodine monochloride, to form a saturated dihaloalkane. These reactions are ordinarily performed by treating the olefin with the desired molecular halogen or interhalogen compound. Such procedures are not commercially desirable in that they require the handling of large amounts of corrosive and toxic materials. In addition, an interhalogen compound, such as iodine monochloride, must be independently synthesized from elemental iodine and chlorine. Furthermore, when iodine monochloride addition to an olefinic bond is attempted with such procedures, the reaction products are frequently contaminated with dichlorides arising from competitive addition reactions of elemental chlorine. The present process obviates the problems associated with the use of molecular halogens and iodine monochloride.

SUMMARY OF THE INVENTION

It has now been discovered that chloroiodoalkanes, chloriodoalkylaryls, dichloroalkenes and dichloroalkylaryls may be selectively prepared in high yields by reacting an organic compound containing at least one nonaromatic carbon to carbon double bond with cupric chloride and an iodide donor. In one embodiment of this invention a straight or branched chain, cyclic or acyclic, substituted or unsubstituted aliphatic monoolefin having from 2 to about 30 carbon atoms is reacted with cupric chloride and an iodide donor in a hydrocarbon medium at temperatures in the range of from 50° to 150° C. in order to form chloroiodoalkanes. In another embodiment of this invention, chloroiodoalkanes are prepared by employing a nonconjugated aliphatic diolefin having from 4 to about 30 carbon atoms as the unsaturated organic feed. In still another preferred embodiment of this invention, alkene substituted aromatic compounds having from 9 to about 30 carbon atoms wherein the double bond is not alpha to the aromatic hydrocarbon radical

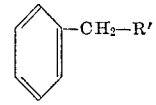

where R' is an alkene radical of the formula:

$$-CR_1R_2=CR_3R_4$$

wherein $R_1$, $R_2$, $R_3$ and $R_4$ may be hydrogen or a $C_1$ to $C_{20}$ alkyl group, are employed as the starting unsaturated organic feed and chloroiodoalkylaryls are formed. In yet another embodiment of this invention, conjugated aliphatic diolefins having from 4 to about 30 carbon atoms are reacted with cupric chloride and an iodide source in an inert hydrocarbon medium at temperatures in the range of from 50° to 150° C. in order to prepare isomeric dichloroalkenes. In still another embodiment of this invention, alkene substituted aromatic compounds containing from 8 to 30 carbon atoms wherein the non-aromatic carbon to carbon double bond is alpha to the aromatic hydrocarbon radical

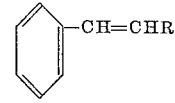

where R is hydrogen or an alkyl radical having from one to 22 carbon atoms, are employed as the starting unsaturated organic feed and dichloroalkylaryls are produced. These reactions are performed under mild conditions and in a substantially anhydrous hydrocarbon medium. The inorganic by-products of the reaction are recovered by filtration and may be regenerated and recycled to the reaction zone. The dihalo compounds are isolated by distillation of the hydrocarbon media. The hydrocarbon media, consisting of either a stoichiometric excess of the starting unsaturated organic feed or an equimolar amount of the unsaturated organic feed dissolved in an inert hydrogen solvent, can be recovered and recycled to the reaction zone.

The dihalo compounds produced with the present process are useful in both the chemical and polymer industries. The chloroiodo compounds prepared according to the instant process have found application in the agricultural chemical field as soil fumigants and pesticidal agents. In addition, chloriodide compounds are useful as vinyl monomer precursors, nylon intermediates, and solvents. Furthermore, it has been found tha catalytic dehydrohalogenation of butene dichlorides prepared by this inventive process provides an excellent route to chloroprene, a valuable synthetic rubber monomer.

In general, any organic compound having at least one nonaromatic carbon to carbon double bond is suitable for use in the present invention. Representative starting compounds include hydrocarbon materials such as: straight chain monoelefins such as ethylene, propylene, butenes, pentenes, hexenes; cyclic aliphatic olefins such as cyclopentene, cyclohexene, cyclooctene; conjugated aliphatic diolefins such as butadiene, piperylene, cyclopentadiene; nonconjugated aliphatic polyolefins such as vinylcyclohexene, cyclooctadiene, cyclododecatrienes; and alkenyl substituted aromatic compounds such as allyl benzene, crotyl benzene, benzocyclohexene and styrene.

The process of this invention is also applicable to unsaturated organic compounds containing functional groups. Thus, for example, unsaturated esters such as methyl acrylate, ethyl acrylate, methyl methacrylate, methyl crotonate, ethyl cinnamate, vinyl acetate, isopropenyl acetate; unsaturated acids such as crotonic acid, cinnamic acid, acrylic acid, methacrylic acid; unsaturated halides such as vinyl chloride, propenyl chloride, allyl chloride; unsaturated nitriles such as acrylonitrile, crotononitrile; unsaturated alcohols such as allyl alcohol, crotyl alcohol, cinnamyl alcohol; and unsaturated ethers such as diallyl ether may be employed in the process of this invention.

It is to be understood that it is only when conjugated aliphatic diolefins or alkene substituted aromatic compounds wherein the nonaromatic carbon to carbon double bond is alpha to the aromatic hydrocarbon radical (as defined above) are employed as the feed mixtures that the process results in the formation of a dichloro compound. While not wishing to be bound to any particular theory, it is believed that when a conjugated diolefin, such as butadiene, is used, the initially formed intermediate (1-chloro-4-iodobutene-2) subsequently experiences a rapid halogen exchange reaction between the highly labile allylic iodide and cuprous or cupric chloride. This halogen exchange reaction produces the dichloroalkenes and simultaneously releases iodine monochloride which may react further with the starting unsaturated organic compounds. However, when monoolefinic aliphatic compounds, nonconjugated aliphatic diolefins, or alkene substituted aromatic compounds wherein the nonaromatic carbon to carbon double bond is not alpha to the aromatic hydrocarbon radical (as defined above) are employed as the starting unsaturated organic feed, no halogen exchange reaction occurs as in the case of butadiene and chloroiodo compounds are formed.

Preferably, the starting organic compounds containing a nonaromatic carbon to carbon double bond are straight or branched chain monoolefins having from 2 to about 20 carbon atoms, cyclic aliphatic monoolefins having from 4 to about 30 carbon atoms, conjugated aliphatic diolefins having from 4 to about 20 carbon atoms, nonconjugated polyolefins having from 4 to about 20 carbon atoms and alkene substituted aromatic compounds having from 8 to about 20 carbon atoms, and mixtures thereof. Substituted monoolefins (unsaturated organic hydrocarbon compounds containing functional groups in addition to the nonaromatic carbon to carbon double bond) having from 4 to about 20 carbon atoms are highly useful starting reagents. More preferably, the starting organic compounds are straight or branched chain hydrocarbon monoolefins having from 2 to about 10 carbon atoms, cyclic aliphatic monoolefins having from 4 to about 12 carbon atoms, conjugated aliphatic diolefins having from 4 to about 10 carbon atoms, nonconjugated polyolefins having from 4 to about 20 carbon atoms, alkene substituted aromatic compounds having from 8 to about 12 carbon atoms and substituted monoolefins having an additional substituted functional group having from 4 to about 12 carbon atoms.

The iodide source may be supplied to the reaction zone as molecular iodine or in the form of an iodide salt of the various metallic elements of Groups I to VIII of the Periodic Chart (as shown on page 373 of Textbook of Chemistry, Mack et al., Ginn and Company (1956)). In general, any compound that liberates iodine under the reaction conditions of the instant invention may be used. While not wishing to be bound to any particular theory, it is believed that the synthesis of chloroiodo compounds according to the instant invention is readily achieved by the coordination of the iodide source with a cupric chloride crystal such that the resulting complex breaks down with the release of iodine monochloride according to the following equation:

Preferably, iodine is supplied to the reaction zone in the form of molecular iodine, lithium iodide, cuprous iodide, and bismuth triiodide.

The halogenation process of this invention is not critically sensitive to the amounts of reagents employed in the process. When a 2:2:1 molar ratio of organic compound, cupric chloride and iodine is employed in the reaction zone, two moles of halogenated product are formed. While the reaction may be carried out in stoichiometric equivalents of the cupric halide, iodide source and unsaturated organic feed, it is customary to employ a molar excess of the unsaturated organic feed such that the starting unsaturated organic feed constitutes the reaction medium. Thus, the hydrocarbon medium consists of either the starting unsaturated organic feed when either stoichiometric or excess amounts of the unsaturated organic feed are employed or an inert hydrocarbon or halogenated hydrocarbon solvent.

When the unsaturated organic feed, such as ethylene and propylene, exists in the gaseous phase at standard conditions, it is desirable that the gaseous organic compounds be dissolved in an inert hydrocarbon solvent such that the halogenation reaction is conducted in the liquid phase. Inert solvents that may be employed include hydrocarbons and halogenated hydrocarbons that have from 1 to about 30 carbon atoms and are preferably saturated hydrocarbons having from 6 to 30 carbon atoms such as hexane, cyclohexane, heptane, isooctane; aromatic hydrocarbons such as benzene, toluene, and xylene; and chlorinated solvents, preferably $C_1$ to $C_6$ solvents, such as carbon tetrachloride, chloroform, methylene chloride and dichloroethane. Preferably, either cyclohexane, n-octane and benzene is used when a solvent is desired.

The halogenation process of this invention is carried out in the substantial absence of water. In preparing the reaction mixture, particularly the solvent medium, care should be exercised to prevent the presence of free water in the reaction zone. Preferably, a substantially anhydrous medium is employed; however, it has been found that the dihydrate of cupric chloride, i.e., $CuCl_2 \cdot 2H_2O$, can be used as a reagent without detrimental effects.

The process of this invention is capable of being carried out under relatively mild reaction conditions. The temperatures employed in the instant process normally vary from 25° to 250° C., preferably from 50° to 150° C. Reaction pressures can vary from 1 to 300 atmospheres, preferably from 1 to 50 atmospheres. The reaction periods utilized can vary from a few minutes to 24 to 48 hours, with a reaction time of 5 to 90 minutes being preferred. The above-described conditions will normally result in conversions of the unsaturated feed in the range of from about 70 to 99 mole percent with selectivities (defined as the number of moles of desired product obtained over number of moles of starting reagent consumed) to the formation of the desired halogenated compounds of at least 85 mole percent usually 95 to 99 mole percent.

DESCRIPTION OF THE PREFERRED EMBODIMENTS

This invention will be further understood by reference to the following examples.

Example 1

To a 250 milliliter round-bottom flask equipped with a reflux condenser and a magnetic stirrer was added 100 milliliters (82 grams; 1 mole) of cyclohexene, 26 grams (0.1 mole) of iodine, and 27 grams (0.2 mole) of cupric chloride. The reaction mixture was stirred at 25° C. for 4.5 hours. Thereafter, the flask containing the reaction mixture was vacuum filtered to remove the cuprous chloride. The filtrate was stripped on a rotary evaporator at 60° C. (20 millimeters of mercury pressure) to remove the excess cyclohexene. The resulting product weighed 48 grams and exhibited a boiling point of 37° C. at 0.2 millimeter of mercury pressure and a refractive index ($n_D^{25}$) of 1.5700. The Nuclear Magnetic Resonance (NMR) spectrum of the product obtained using a $CDCl_3$ solvent and a tetramethyl silane internal reference showed a methylene envelope at delta 1.2 to 2.8 (indicating the presence of 8 hydrogens) and a complex multiplet at delta 4.4 (indicating the presence of 2 hydrogen atoms). Gas chromatography analysis using a 2 meter x ¼ inch 20% diethylene glycol succinate column at 125° C. and 15 p.s.i.g. helium pressure showed a single compound, with a retention time of 31.4 minutes. The infrared spectrum of the product was identical to that of a know sample of 1-chloro-2-iodo cyclohexane.

The product was also subjected to a carbon, hydrogen, chlorine, iodine analysis. It was found to contain 29.57 wt. percent carbon, 4.13 wt. percent hydrogen, 14.41 wt. percent chlorine and 51.40 wt. percent iodine. The product, 1-chloro-2-iodocyclohexane, which has a general formula of $C_6H_{10}ClI$, should contain 29.47 wt. percent carbon, 4.12 wt. percent hydrogen, 14.50 wt. percent chlorine and 51.90 wt. percent iodine.

Example 2

The procedure of Example 1 was followed except that the reaction was heated at 100 to 110° C. for five minutes. After the workup cited in Example 1, 41 grams (84 mole percent based on total starting reagents) of 1-chloro-2-iodocyclohexane was recovered.

Example 3

Following the procedure of Example 1, 100 milliliters of hexene-1,27 grams of cupric chloride and 26 grams of iodine were reacted at 105 to 110° C. for 45 minutes. After the workup cited in Example 1, 44.7 grams (91 mole percent based on total starting reagents) of chloroiodohexane were recovered.

Example 4

Following the procedure of Example 1, except using 100 milliliters of cyclohexane as solvent, 20 milliliters of cyclohexene were reacted with 26 grams of iodine and 27 grams of cupric chloride. The reaction mixture was heated at 60° C. for 20 minutes. After the workup cited in Example 1, 42.8 grams (88 mole percent based on total starting reagents) of 1-chloro-2-iodocyclohexane were recovered.

Example 5

Following the procedure of Example 1, 100 milliliters of cyclohexene were reacted with 20 grams of cuprous iodide and 26 grams of cupric chloride. The reaction mixture was heated at 100° C. for five minutes. After the workup cited in Example 1, 20 grams (83 mole percent based on total starting reagents) of 1-chloro-2-iodocyclohexane were recovered.

Example 6

Following the procedure of Example 1, 50 milliliters of cyclohexene, 13.5 grams of cupric chloride, and 6.9 grams of lithium iodide were heated at 80° C. for 4.5 hours. After the workup cited in Example 1, 12.9 grams of 1-chloro-2-iodocyclohexane were recovered.

Example 7

Following the procedure of Example 1, 50 milliliters of cyclohexene, 13.5 grams of cupric chloride, and 10 grams of bismuth triiodide were heated together at 80° C. for two hours. After the workup cited in Example 1, 11.9 grams (97 mole percent based on total starting reagents) of 1-chloro-2-iodocyclohexane were recovered.

Example 8

Following the procedure of Example 1, 100 milliliters of cyclohexene were admixed with 26 grams of iodine and 34 grams of cupric chloride dihydrate. The reaction mixture was heated at 90° C. for two hours. After the workup cited in Example 1, 51 grams (84 mole percent based on total starting reagents) of 1-chloro-2-iodocyclohexane were recovered.

Example 9

Into a Parr low pressure reactor were placed 100 milliliters of cyclohexane, 27 grams (0.2 mole) of cupric chloride and 26 grams (0.10 mole) of iodine. The reactor was charged with ethylene (22 p.s.i.g.) and the mixture was heated at 60° C. for two hours. Thereafter, the reaction mixture was filtered and the cyclohexane removed on a rotary evaporator at 60° C. and 20 millimeters of mercury pressure. The crude product (18.3 grams) was purified by distillation resulting in 14.3 grams (75 mole percent based on total starting reagents) of 1-chloro-2-iodoethane and 4 grams of crystalline 1,2-di-iodoethane.

Example 10

Following the procedure of Example 9, the reactor was charged with propylene. After the workup cited in Example 9, 24.2 grams (59 mole percent based on total starting reagents) of chloroiodopropane were recovered.

Example 11

Using the procedure and reactants of Example 10, the reaction was performed at a temperature varying from 80 to 100° C. for four hours. After the workup cited in Example 9, 30.5 grams (75 mole percent based on total starting reagents) of chloroiodopropane were recovered.

Example 12

Following the procedure of Example 9, a Parr reactor was charged with 100 milliliters of benzene, 13 grams of cupric chloride, 16 grams of cupric chloride dihydrate, and 26 grams of iodine. The reactor was purged with propylene and then pressurized with propylene to 100 p.s.i.g. The reaction mixture was heated to 60° C. and maintained at this level for ninety minutes. After the workup cited in Example 9, 24.2 grams (60 mole percent based on total starting reagents) of chloroiodopropane were recovered.

Example 13

Following the procedure of Example 9, a Parr reactor was charged with 100 milliliters of benzene, 27 grams of cupric chloride, 26 grams of iodine. The system was purged with butadiene and pressurized with butadiene to 20 p.s.i.g. at room temperature. The reaction mixture was agitated at 60 to 70° C. for 1.5 hours. After the workup cited in Example 9, 24.3 grams (98 mole percent based on total starting reagents) of isomeric dichlorobutenes were recovered.

Example 14

Following the procedure of Example 1, 100 milliliters of vinyl acetate, 26 grams (0.1 mole) of iodine and 27 grams (0.2 mole) of cupric chloride were added to a glass reaction vessel. The reaction was heated at 80° C. for two hours. After the workup cited in Example 1, 50.1 grams (88 mole percent based on total starting reagents) of 1-chloro-2-iodo ethyl acetate were recovered.

Example 15

Following the procedure of Example 1, 100 milliliters of carbon tetrachloride, 20 milliliters of cyclohexene, 26 grams of iodine and 27 grams of cupric chloride were added to a glass reaction vessel. The reaction was heated at a temperature of 80° C. for five minutes. After the workup cited in Example 1, 43.4 grams (90 mole percent based on total starting reagents) of 1-chloro-2-iodocyclohexane were recovered.

Example 16

To a 250 milliliter round-bottom flask equipped with a reflux condenser and a magnetic stirrer was added 60 milliliters of n-octane, 13 grams (0.05 mole) of iodine and 13.3 grams (0.1 mole) of cupric chloride. After the mixture was stirred and refluxed, a solution of 10.4 grams (0.1 mole) of styrene in 40 milliliters of n-octane was added dropwise to this mixture over a period of 40 minutes. After the reaction mixture was held at reflux temperature for another 10 minutes, the vessel and reaction mixture were cooled in an ice bath and the product filtered. The excess iodine was removed by washing with a sodium thiosulfate solution. The octane solution was dried over magnesium sulfate and the solvent was removed on a rotary evaporator at 60° C. at 20 millimeters of mercury pressure to give 17.4 grams of crude product. The crude product was distilled to yield 13.8 grams (79 mole percent based on total starting reagents) of dichlorostyrene, having a boiling point of 67 to 70° C. at 0.2 millimeter of mercury. The structure of dichlorostyrene was confirmed by NMR spectroscopy and elemental analysis.

While the invention has been described with reference to various examples and embodiments, it will be apparent to those skilled in the art that various modifications may be made without departing from the principles and the true nature of the invention, which is intended to be limited only by the scope of the appended claims.

What is claimed is:
1. A process for the selective formation of chloroiodo and dichloro organic compounds which comprises reacting a stoichiometric excess of an organic compound selected from the group consisting of monoolefins having from 2 to about 20 carbon atoms, conjugated diolefins having from 4 to about 20 carbon atoms, nonconjugated polyolefins having from 4 to about 20 carbon atoms, and alkene substituted aromatic compounds having from 8 to about 20 carbon atoms with cupric chloride and an iodide source selected from the group consisting of molecular iodine, lithium iodide, cuprous iodide and bismuth triiodide in the substantial absence of water at a temperature in the range of from about 25° to about 150° C.

2. The process of claim 1 wherein the reaction is conducted in a hydrocarbon media selected from the group consisting of saturated hydrocarbons having from 1 to about 30 carbon atoms, aromatic hydrocarbons selected from the group consisting of benzene, toluene and xylene and saturated chlorinated hydrocarbons containing from 1 to about 6 carbon atoms.

3. The process of claim 2 wherein the hydrocarbon media is a saturated hydrocarbon having from 6 to 30 carbon atoms.

4. The process of claim 1 wherein the iodine source is molecular iodine.

5. The process of claim 1 wherein the reaction is conducted in a substantially anhydrous medium.

6. A process for the selective formation of chloroiodo compounds which comprises reacting an organic compound selected from the group consisting of monoolefins having from 2 to about 10 carbon atoms, nonconjugated polyolefins having from 4 to about 20 carbon atoms, alkene substituted aromatic compounds having the formula:

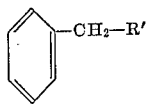

wherein R' is an alkene radical of the formula:

$$-CR_1R_2=CR_3R_4$$

wherein $R_1$, $R_2$, $R_3$, and $R_4$ are selected from the group consisting of hydrogen or a $C_1$ to $C_{20}$ alkyl group with cupric chloride and an iodide source selected from the group consisting of molecular iodine, lithium iodide, cuprous iodide, and bismuth triiodide in a hydrocarbon medium selected from the group consisting of a stoichiometric excess of said organic compounds, a saturated hydrocarbon having from 1 to 30 carbon atoms, an aromatic hydrocarbon selected from the group consisting of benzene, toluene and xylene, and saturated chlorinated hydrocarbons having from 1 to about 6 carbon atoms, in the substantial absence of water at a temperature ranging from about 25° to about 250° C.

7. The process of claim 6 wherein the hydrocarbon media consists of a stoichiometric excess of the organic compound.

8. The process of claim 6 wherein the hydrocarbon medium consists of the saturated hydrocarbon having from 6 to about 30 carbon atoms.

9. The process of claim 8 wherein the organic compound is a monoolefin having from 2 to about 10 carbon atoms.

10. The process of claim 8 wherein the organic compound is a non-conjugated polyolefin having from 4 to about 20 carbon atoms.

11. The process of claim 6 wherein the iodide source is molecular iodine.

12. The process of claim 8 wherein the iodide source is molecular iodine.

13. A process for the selective formation of dichloro organic compounds which comprises reacting an organic compound selected from the group consisting of conjugated diolefins having from 4 to 20 carbon atoms and alkene substituted aromatic compounds having the formula:

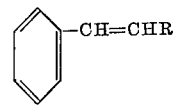

wherein R is selected from the group consisting of hydrogen or an alkyl radical having from 1 to about 12 carbon atoms with cupric chloride and an iodide source selected from the group consisting of molecular iodine, lithium iodide, cupric iodide and bismuth triiodide in a hydrocarbon media selected from the group consisting of a stoichiometric excess of said organic compound, a saturated hydrocarbon having from 1 to about 30 carbon atoms, an aromatic hydrocarbon selected from the group consisting of benzene, toluene and xylene and saturated chlorinated hydrocarbons having from 1 to about 6 carbon atoms in the substantial absence of water at a temperature in the range of from about 25° to about 250° C.

14. The process of claim 13 wherein the hydrocarbon media consists of a stoichiometric excess of the organic compound.

15. The process of claim 13 wherein the hydrocarbon medium consists of the saturated hydrocarbon having from 6 to about 30 carbon atoms.

16. The process of claim 15 wherein the organic compound is a monoolefin having from 2 to about 10 carbon atoms.

17. The process of claim 15 wherein the organic compound is a nonconjugated polyolefin having from 4 to about 20 carbon atoms.

18. The process of claim 13 wherein the iodide source is selected from the group consisting of molecular iodine, lithium iodide, cuprous iodide and bismuth triiodide.

19. The process of claim 15 wherein the iodide source is molecular iodine.

20. The process of claim 1 wherein the organic compound containing at least one nonaromatic carbon to carbon double bond is selected from the group consisting of monoolefins having frm 2 to about 20 carbon atoms; nonconjugated diolefins having from 4 to about 20 carbon atoms; and alkene substituted aromatic compounds having the formula:

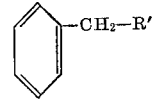

where R' is an alkene radical of the formula:

$$-CR_1R_2=CR_3R_4$$

wherein $R_1$, $R_2$, $R_3$ and $R_4$ are selected from the group consisting of hydrogen or a $C_1$ to $C_{20}$ alkyl group and recovering chloroiodo organic compounds.

21. The process of claim 1 wherein the organic compound containing at least one nonaromatic carbon to carbon double bond is selected from the group consisting of conjugated diolefins having from 4 to about 20 carbon atoms and alkene substituted aromatic compounds having the formula:

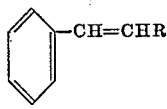

where R is selected from the group consisting of hydrogen or an alkyl radical having from 1 to about 12 carbon atoms and recovering dichloro organic compounds.

22. The process of claim 6 wherein the hydrocarbon medium is selected from the group consisting of a stoichiometric excess of the organic compound, a $C_6$ to $C_{20}$ saturated hydrocarbon or a $C_1$ to $C_2$ saturated halogenated hydrocarbon.

23. The process of claim 1 wherein the reaction is conducted at a temperature in the range of from about 50° to 150° C.

References Cited
UNITED STATES PATENTS 3,206,517  9/1965  Fenton _____ 260—648

OTHER REFERENCES

Arganbright et al.: J. Org. Chem. 27 (4) 1205–1207 (1962).

DANIEL D. HORWITZ, Primary Examiner

U.S. Cl. X.R.

260—654, 614, 648, 633, 659, 618, 487, 488, 576, 539, 515, 465.7; 23—216